United States Patent [19]

Braun

[11] 4,070,955
[45] Jan. 31, 1978

[54] COFFEE FILTER

[75] Inventor: Werner Braun, Sarnen, Switzerland

[73] Assignee: Maxs AG, Sachseln, Switzerland

[21] Appl. No.: 743,679

[22] Filed: Nov. 22, 1976

[30] Foreign Application Priority Data

Nov. 25, 1975 Germany .................. 7537473[U]

[51] Int. Cl.² ............................................. A23F 1/08
[52] U.S. Cl. ........................................ 99/284; 99/306
[58] Field of Search ............... 99/296, 304, 317, 318, 99/322, 323, 306, 284

[56] References Cited

U.S. PATENT DOCUMENTS

| 370,141 | 9/1887 | Hobbs | 99/322 X |
|---|---|---|---|
| 1,456,010 | 5/1923 | Richheimer | 99/306 |
| 2,365,269 | 12/1944 | Hill | 99/304 X |
| 3,983,797 | 10/1976 | Wurm | 99/306 |

FOREIGN PATENT DOCUMENTS

| 1,214,364 | 11/1959 | France | 99/322 |
|---|---|---|---|
| 647,047 | 6/1937 | Germany | 99/322 |
| 2,359,348 | 6/1975 | Germany | 99/317 |

*Primary Examiner*—Edward L. Roberts
*Attorney, Agent, or Firm*—Frederick E. Bartholy

[57] ABSTRACT

A filtering device for the preparation of coffee, with a pot-shaped vessel, at the bottom of which a sieve sheet is attached, and with a water distribution plate, which is adapted to be supported by the upper edge of the vessel. The diameter of the water distribution plate is smaller than the inner diameter of the vessel, and a plurality of feet protrude from the edge of the water distribution plate nearly perpendicularly to the surface of the same. The free ends of the feet each form a shoulder, which serve to rest on the upper edge of the vessel such that the water distribution plate lies within the interior of the vessel and leaves a circumferential clearance to the same. Hot water which is poured onto the water distribution plate flows through that clearance onto the coffee powder. The water distribution plate may be removed from the vessel and laid onto a surface with its feet down as a base plate for the vessel, thus collecting water that might still pass through the filter. A rim protruding from the circumference of the water distribution plate prevents water from flowing down when the same is used as a base plate.

5 Claims, 3 Drawing Figures

COFFEE FILTER

BACKGROUND OF THE INVENTION

In a known filtering device for the preparation of coffee, a water distribution plate is provided with central openings, through which hot water drops onto the coffee powder. In such a device, the water distribution plate may not serve as a base plate.

BRIEF SUMMARY OF THE INVENTION

It is an object of the invention to provide a coffee filter, in which the water distribution plate may also serve as a base plate for receiving the pot-shaped vessel or hot water container after the same has been used.

It is another object of the invention to achieve a uniform distribution of the hot water when the same is poured onto the water distribution plate.

Those and other objects are achieved by a filtering device comprising a pot-shaped vessel or hot water container, at the bottom of which a sieve sheet is attached, and a water distribution plate having a plurality of feet protruding from the edge of the same, the feet having bent portions or shoulders which fit on the upper edge of the vessel so as to hold the water distribution plate in the interior of the same in a fixed distance relationship to the inner wall of the vessel. The clearance between the vessel and the circumferential edge of the water distribution plate serves for uniformly distributing the hot water on the coffee powder. A rim is protruding from the edge of the water distribution plate at the front side opposite to the feet. The water distribution plate may be put with its feet down onto a surface and thus serve as a base plate to receive the vessel before or after use. The edge of the bottom of the vessel is so dimensioned that it has a configuration and area that is within the area defined by the rim.

BRIEF DESCRIPTION OF THE SEVERAL VIEWS OF THE DRAWINGS

Other features and embodiments will be apparent from the following non-limitative description of the invention accompanied by the drawings, in which.

DETAILED DESCRIPTION OF THE PREFERRED EMBODIMENT

Figure 1:
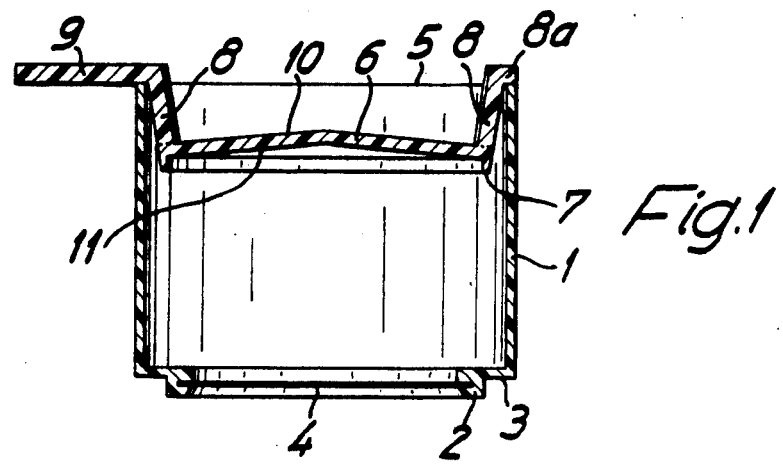
FIG. 1 is a vertical section along line II—II of FIG. 2 through a coffee filter with a water distribution plate.

The coffee filter shown in the drawings comprises a pot-shaped vessel 1 made of plastics material which is provided at its bottom with a radially inwardly facing edge 2 which serves as a support for a perforated metal sieve sheet 4. The edge 2 is provided at its bottom with an outwardly directed shoulder 3.

The coffee filter further comprises a water distribution plate 6. Three feet 8 which are equally distributed over the circumference of the water distribution plate, protrude almost normally to its plane from the one front surface 10 of the same, terminating in shoulders 8a.

The shoulder of one of the feet protrudes over the upper edge 5 of the vessel 1 and forms a handle.

The front surface 10 next to the feet of the water distribution plate 6 has a convex shape, while the other front side 11 has a concave shape.

The circumferential edge of the water distribution plate is provided with a rim 7 protruding from the front side 11 opposite of the feet 8.

Figure 3:
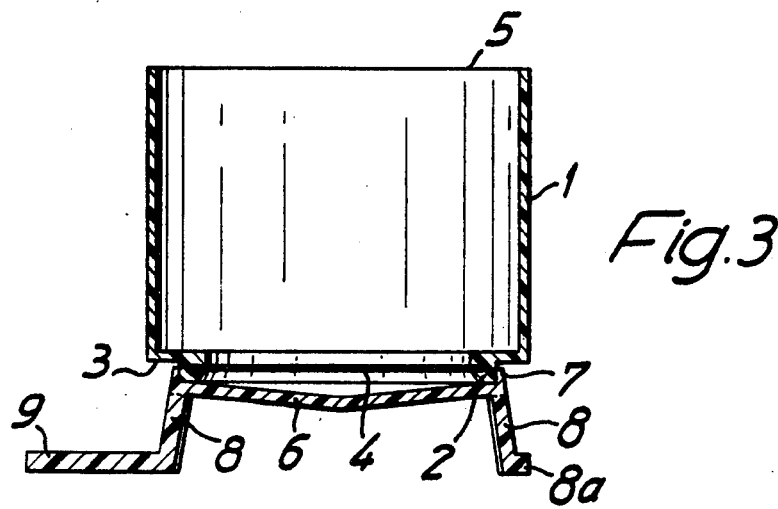
FIG. 3 is a veiw similar to FIG. 1, in which, however, the water distribution plate is used as a base plate with the vessel put thereon.

The water distribution plate 6 is removable. FIG. 3 shows the water distribution plate with its feet down and serving as a base plate. The shoulder 3 provided at the lower edge 2 of the vessel 1 is so dimensioned that the edge 2 fits into the region defined by the rim 7 so that the vessel 1 cannot slip down from the water distribution plate 6 when placed on it.

In using the coffee filter, coffee powder is put onto the sieve sheet 4 of the vessel 1 and the water distribution plate 6 is thereupon put onto the vessel as shown in FIG. 1. Hot water is then poured onto the water distribution plate and flows over the circumferential edge of the same into the vessel 1, wets the coffee powder and flows through the sieve sheet 4 into a container put underneath the vessels, for instance a cup (not shown).

When all of the hot water has passed through the sieve sheet, the water distribution plate 6 is removed from the vessel 1 and put with its feet 8 down onto a table or the like, where it serves as a base plate. The vessel 1 is thereupon put onto the water distribution plate 6, as shown in FIG. 3, and any residual water is collected by the front side 11, the rim 7 preventing water from dropping down.

Figure 2:
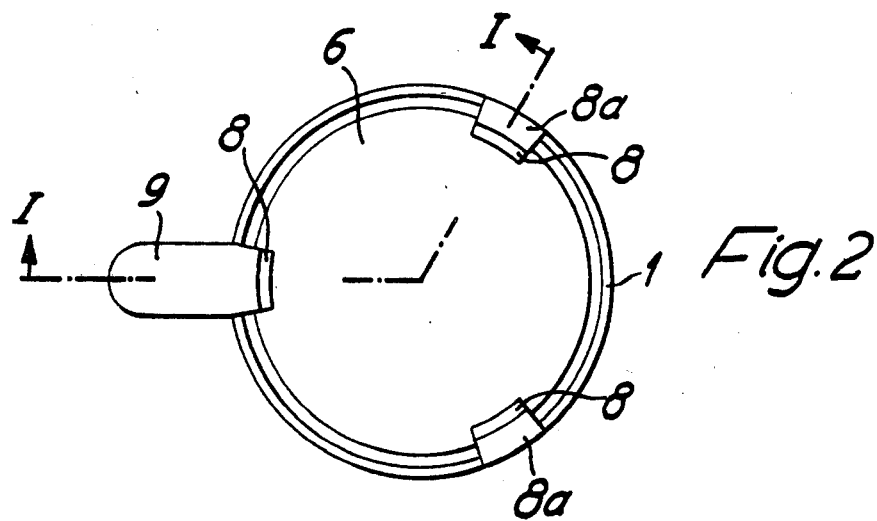
FIG. 2 is a top view of the water distribution plate.

FIG. 2 is a top view of the water distribution plate taken from the front side 11.

The coffee filter is preferably adapted for preparing one cup of coffee or two. The diameter and width of the shoulder 3 should then be dimensioned such that the vessel fits on cups of different sizes.

The ends of the feet 8 adjacent the shoulders 8a lie in a circle corresponding generally to the inner diameter of the vessel 1. By this, the water distribution plate is supported radially unmovable by the vessel and the edge of the water distribution plate is equidistant from the wall of vessel 1 all over its periphery. This guarantees a uniform flow of hot water over the circumferential edge.

The gap between the inner wall of vessel 1 and the rim of the water distribution plate 6 when put onto the vessel is not exceeding 1 mm. This contributes to a very uniform distribution of the hot water when flowing down onto the coffee powder.

Additionally, the perforated sieve sheet 4 may be provided with struts (not shown) extending radially from the center to the edge 2 and dividing the surface of the sieve sheet into several compartments separated from one another, so that the coffee powder can no longer be easily washed away when the hot water is not equally distributed.

I claim:

1. A filtering device for the preparation of coffee, comprising a pot-shaped vessel, a sieve attached to the bottom of said vessel, and a water distribution plate adapted to be supported by the upper edge of said vessel, characterized by the fact that the diameter of the water distribution plate (6) is smaller than the inner diameter of the vessel (1), that at least three feet (8) protrude from the edge of the water distribution plate generally perpendicularly to the surface of the same, that the free ends of the feet (8) are provided with shoulders (8a) adapted to be put onto the upper edge (5) of said vessel, that the water distribution plate is provided with a rim (7) protruding from its front side (11) which is opposite to the feet (8), and that the edge (2) of the bottom of the vessel (1) is dimensioned such that it has a configuration which is within an area defined by said rim (7).

2. A filtering device according to claim 1, characterized by the fact that the length of one of the shoulders (8a) of one foot (8) is dimensioned such that it protrudes over the edge of the vessel (1) thus forming a handle.

3. A filtering device according to claim 1, characterized by the fact that the front surface (10) of the water distribution plate (6) next to the feet (8) has a convex shape.

4. A filtering device according to claim 1, characterized by the fact that the front side (11) of the water distribution plate (6) opposite to the feet (8) has a concave shape.

5. A filtering device according to claim 1, characterized by the fact that the feet (8) are obliquely outwardly inclined.

* * * * *